(12) United States Patent
Zwahlen et al.

(10) Patent No.: US 11,744,238 B2
(45) Date of Patent: Sep. 5, 2023

(54) BLOWER SPRAY DEVICE

(71) Applicant: BIRCHMEIER SPRÜHTECHNIK AG, Stetten (CH)

(72) Inventors: Jürg Zwahlen, Triesen (LI); Michael Zaugg, Aarau (CH); Harald Glenz, Salgesch (CH); Frank Rimpl, Sion (CH); Sébastien Demont, Sion (CH)

(73) Assignee: Birchmeier Sprühtechnik AG, Stetten (CH)

( * ) Notice: Subject to any disclaimer, the term of this patent is extended or adjusted under 35 U.S.C. 154(b) by 280 days.

(21) Appl. No.: 16/606,641

(22) PCT Filed: Apr. 19, 2018

(86) PCT No.: PCT/IB2018/052738
§ 371 (c)(1),
(2) Date: Oct. 18, 2019

(87) PCT Pub. No.: WO2018/193406
PCT Pub. Date: Oct. 25, 2018

(65) Prior Publication Data
US 2020/0054000 A1 Feb. 20, 2020

(30) Foreign Application Priority Data

Apr. 19, 2017 (CH) .................................. 00524/17

(51) Int. Cl.
*A01M 7/00* (2006.01)
*B05B 7/00* (2006.01)
(Continued)

(52) U.S. Cl.
CPC ........ *A01M 7/0046* (2013.01); *A01M 7/0021* (2013.01); *A01M 7/0035* (2013.01);
(Continued)

(58) Field of Classification Search
CPC .............. A01M 7/0046; A01M 7/0021; A01M 7/0036; B05B 12/18; B05B 12/0026; B05B 7/0075; B05B 13/005
See application file for complete search history.

(56) References Cited

U.S. PATENT DOCUMENTS 2,029,337 A * 2/1936 Parker ................... B05B 7/0075
239/455
4,502,634 A * 3/1985 Bals ....................... B05B 7/0075
239/223
(Continued)

FOREIGN PATENT DOCUMENTS

CH 327997 2/1958
DE 10 2012 012 800 A1 1/2014
(Continued)

OTHER PUBLICATIONS

International Search Report and Written Opinion, dated Aug. 21, 2018, for International Application No. PCT/IB2018/052738, 11 pages (with English translation of Search Report).
(Continued)

*Primary Examiner* — Joseph A Greenlund
(74) *Attorney, Agent, or Firm* — Jones Robb, PLLC (57) ABSTRACT

A blower spray device is provided having a housing which comprises an electrically driven blower and a spray nozzle, and having a liquid supply line opening into the spray nozzle. The housing has a funnel-shaped intake channel and a tubular blow-out channel, and an electrical valve is provided in the liquid supply line to activate and deactivate the liquid supply to the spray nozzle. An electronic controller having a regulating unit for the electric blower is further provided to adjust the air flow velocity.

17 Claims, 5 Drawing Sheets

(51) Int. Cl.
　　　*B05B 12/18*　　(2018.01)
　　　*B05B 7/24*　　(2006.01)
　　　*B05B 12/00*　　(2018.01)
　　　*B05B 13/00*　　(2006.01)

(52) U.S. Cl.
　　　CPC ........ *B05B 7/0075* (2013.01); *B05B 12/0026* (2018.08); *B05B 12/18* (2018.02); *B05B 13/005* (2013.01); *B05B 7/2475* (2013.01)

(56) References Cited

U.S. PATENT DOCUMENTS

| | | | | |
|---|---|---|---|---|
| 4,915,304 | A * | 4/1990 | Campani | B05B 12/0024 239/581.1 |
| 5,190,217 | A * | 3/1993 | Black | B05B 7/1495 239/526 |
| 6,216,961 | B1 * | 4/2001 | Utter | B05B 7/0075 239/289 |
| 6,889,773 | B2 * | 5/2005 | Hanratty | A62C 31/12 239/289 |
| 7,559,490 | B2 * | 7/2009 | Rappin | B05B 7/2475 239/289 |
| 10,065,202 | B2 * | 9/2018 | Campbell | B05B 7/2416 |
| 10,226,037 | B2 * | 3/2019 | States, III | A01M 1/2038 |
| 11,067,087 | B2 * | 7/2021 | Tirone | F04D 29/522 |
| 2004/0123991 | A1 * | 7/2004 | Hanratty | A62C 31/12 169/44 |
| 2005/0284958 | A1 * | 12/2005 | Clarke, III | B05B 7/0081 239/69 |
| 2007/0029407 | A1 * | 2/2007 | Rappin | B05B 7/2435 239/340 |
| 2009/0008473 | A1 * | 1/2009 | Yun | A01M 11/00 239/85 |
| 2009/0200395 | A1 * | 8/2009 | Duru | B05B 17/0669 239/102.1 |
| 2009/0224066 | A1 * | 9/2009 | Riemer | A21C 15/002 239/102.1 |
| 2009/0235925 | A1 * | 9/2009 | Power | B05B 17/0669 128/200.14 |
| 2016/0265540 | A1 * | 9/2016 | Tirone | F04D 25/0673 |
| 2016/0279652 | A1 * | 9/2016 | States, III | A01M 1/2033 |
| 2016/0303335 | A1 * | 10/2016 | Hong | A61M 15/0025 |
| 2018/0160670 | A1 * | 6/2018 | Pellenc | B05B 3/105 |
| 2020/0054000 | A1 * | 2/2020 | Zwahlen | B05B 13/005 |
| 2020/0246764 | A1 * | 8/2020 | Putrello | B05B 3/1007 |

FOREIGN PATENT DOCUMENTS

| | | | | |
|---|---|---|---|---|
| FR | 3 023 495 | A1 | 1/2016 | |
| FR | 3023495 | A1 * | 1/2016 | ............ B05B 7/066 |
| KR | 10-2012-0056541 | A | 4/2012 | |
| WO | 2012/150614 | A1 | 8/2012 | |

OTHER PUBLICATIONS

Birchmeier Sprühtechnik AG (Spierenburg); Statement on the written opinion of the International Searching Authority dated Aug. 21, 2018, for International Application No. PCT/IB2018/052738, 5 pages (with English translation).

Written Opinion of the International Searching Authority, dated Aug. 21, 2018, for International Application No. PCT/IB2018/052738, 6 pages (English translation ).

* cited by examiner

BLOWER SPRAY DEVICE

BACKGROUND

Technical Field

The disclosure relates to a blower spray device and a method for producing a spray mist with such a blower spray device.

Description of the Related Art

Blower spray devices, known as motor sprayers, are used, for example, for plant protection in agriculture or for pest control in horticulture.

Such a motor sprayer is essentially composed of a spray tank portable on the back, a petrol engine and a blower, and is known for example from CH-A-327 997. An air filter is connected upstream of the blower intake chamber and the blower pressure chamber is connected to a wide compressed-air hose and a narrower supply-air line. The other end of this line opens out just above the bottom of the spray agent tank so that the escaping compressed air agitates the spray liquid in the tank. The exhaust air leaves the container via an exhaust air channel. An atomizer nozzle is provided at the outlet end of the compressed-air hose, to which a supply line for the spray liquid and the exhaust air channel are connected. Until now, such motor sprayers have been operated with petrol engines, which are relatively noisy and produce exhaust gases. Another disadvantage of petrol engines is the insufficient adjustability of the air flow velocity. This circumstance is caused by the functional principle of such motor sprayers. Without a high air outlet velocity, today's motor sprayers would not be able to spray the supplied spray liquid. However, these high air velocities can lead to plant damage. It can also happen that, as a result of the high air velocity, the active ingredient is sprayed past the plant and does not accumulate on the plant.

To obtain improved atomization of such a motor sprayer, DE-A-102012012800 describes a spray device for a handheld blower comprising an air channel assembly and a spray nozzle, wherein the air channel assembly extends along a longitudinal axis predetermined by the spraying direction. The air channel arrangement comprises two blow-out channel sections in which the blowing air flow is divided into two partial air flows emerging from the two air nozzles. The two blow-out channel sections lead into two air nozzles arranged next to each other in a lateral direction relative to the longitudinal axis in such a way that an air-flow-free space is formed between the two partial air flows. The spraying agent nozzle is positioned in the air-flow-free space, wherein a spraying agent is atomized into droplets by means of the spraying agent nozzle in the air-flow-free space and introduced into the air-flow-free space. The air-flow velocity of the two partial air flows is in the range of 30 m/s to 120 m/s, preferably 70 m/s. The air-flow velocity of the two partial air flows is in the range of 30 m/s to 120 m/s, preferably 70 m/s. The droplet velocity of the atomized spray is in the range of 2 m/s to 40 m/s, preferably 10 m/s. The spray medium pressure is in the range of 2 bar to 15 bar, preferably 5 bar. When the partial air flows and the atomized spray meet, a mixture is formed which has a flow velocity of 10 m/s to 80 m/s, in particular 40 m/s.

The above motor sprayer has the same disadvantages as described above.

In KR-A-20120056541 a portable sprayer is described with a tank, an electric pump, a long blowpipe with a blower directly at the inlet and a spray nozzle directly in front of the outlet of the blowpipe. The blowpipe has a constant diameter over its entire length. The spray nozzle is connected to the tank via a hose. A lever is also provided on the blowpipe with which a manually operated valve in the hose can be opened and closed. On the one hand, the pump motor is connected to the positive pole of a battery via a pump control and an operating switch, and on the other hand, the blower motor is connected to the positive pole of the battery via a blower control and the operating switch. This operating switch is located in the lever on the blowpipe. In addition, a pressure switch is provided at the minus pole of the battery, which is electrically connected to the pump control and the blower control. This pressure switch is attached to the pump. If the pressure at the pump is too high, the switch switches off so that the pump control and the blower control are disconnected from the battery. The blower and the pump are switched on and off by means of a simple pressure switch. An adjustable adjustment of the air speed and the spray agent pressure is not provided with this spray device.

BRIEF SUMMARY

Embodiments of the present invention provide a portable blower spray device, which enables an efficient and environmentally friendly use of the spraying agent and a homogeneous spray pattern. A method for producing a spray mist with such a blower spray device is also provided.

Embodiments of the present invention are based on the knowledge that only the interaction of an adjustable setting of the air flow speed and an adjustable setting of the spray pressure with the correct selection of the spray nozzle leads to the desired spray pattern of the spray mist to be produced. However, the spray medium pressure can also be predetermined in a fixed manner if the area of application is limited.

Embodiments of the present invention have the advantage that a defined spray pattern of the spray mist is produced, wherein the blower spray device is operated with an adjustable air flow speed. A further advantage of embodiments of the invention is that the blower spray device can be adapted precisely to the different requirements for the respective applications by precisely regulating the air speed and adjusting the spray quantity and droplet size by selecting the right nozzle and pressure. The blower spray device according to embodiments of the invention makes it possible, through the correct selection of the above parameters and the limitation of the influencing variables, to correspond much better to the spraying pattern required by a given application than with today's known methods of blower spraying technology. The air flow is only required to transport the droplets in the spray mist, but not to form the droplets.

A blower spray device according to an embodiment of the invention is provided with a housing which comprises an electrically driven blower with a blade wheel and a spray nozzle, and comprises a liquid supply line which opens into the spray nozzle, wherein the housing has a funnel-shaped intake channel and a tubular blow-out channel, and wherein guide vanes are provided in the tubular blow-out channel in a direction of flow downstream of the blade wheel, which guide vanes are designed and arranged in such a way that turbulence produced by the blade wheel merges into a uniform, swirl-free or approximately swirl-free air flow in the axial direction. The spray nozzle is arranged along a longitudinal axis in the blow-out channel so that the swirl-free or almost swirl-free air flow encases the spray mist emerging from the spray nozzle. An electrically actuated valve is also provided in the liquid supply line to turn the liquid supply to the spray nozzle on and off. Furthermore, an electronic control with a control unit for the electric blower is provided.

It is advantageous if the electric blower is arranged in an elongated, tubular housing which also serves for the mechanical attachment of the spray nozzle.

It has proved to be best practice to fasten and/or mount the electric blower or the spray blower units floating in the housing.

It is advantageous that the blower is mounted in the blow-out channel, and the spray nozzle is arranged in the direction of flow at a first distance from the blower in the blow-out channel and at a second distance from the outlet of the blow-out channel.

In accordance with one advantageous embodiment, the intake channel has the advantage of an inlet opening with a first, large cross-section and an outlet opening with a second, smaller cross-section.

In a preferred embodiment of the blower spray device, the spray nozzle is a full-cone nozzle.

In another preferred embodiment of the blower spray device, the spray nozzle is a hollow-cone nozzle.

In another preferred embodiment of the blower spray device, the spray nozzle is an injector nozzle.

In another preferred embodiment of the blower spray device, the spray nozzle is a flat spray nozzle.

In another preferred embodiment of the blower spray device, the spray nozzle is a multi-component nozzle.

In another preferred embodiment of the blower spray device, the spray nozzle is a piezo ultrasonic atomizer.

In another preferred embodiment of the blower spray device, the spray nozzle is a spinning disk.

The blower spray device is preferably portable.

The blower spray device may also be mounted on a chassis. A method for producing a spray mist is provided in connection with a blower spray device according to one or more embodiments of the invention and a spray device with pressure regulation, wherein a spray liquid is selected for the respective application and the nozzle is determined from a selection of spray nozzles. The nozzle is selected for the application based on pressure, spray angle, flow rate and droplet size. Subsequently, the spray liquid is pressurized with a pressure set for the application and/or for the selection, and the air flow speed of the blower is set for the application.

BRIEF DESCRIPTION OF THE SEVERAL VIEWS OF THE DRAWINGS

Further advantages of embodiments of the invention follow from the claims and from the following description, in which aspects of the invention are explained in detail by means of example embodiments shown in the schematic drawings, wherein:

The same reference numerals have been used in the figures for the same elements and initial explanations apply to all figures, unless explicitly stated otherwise.

DETAILED DESCRIPTION

Figure 1:
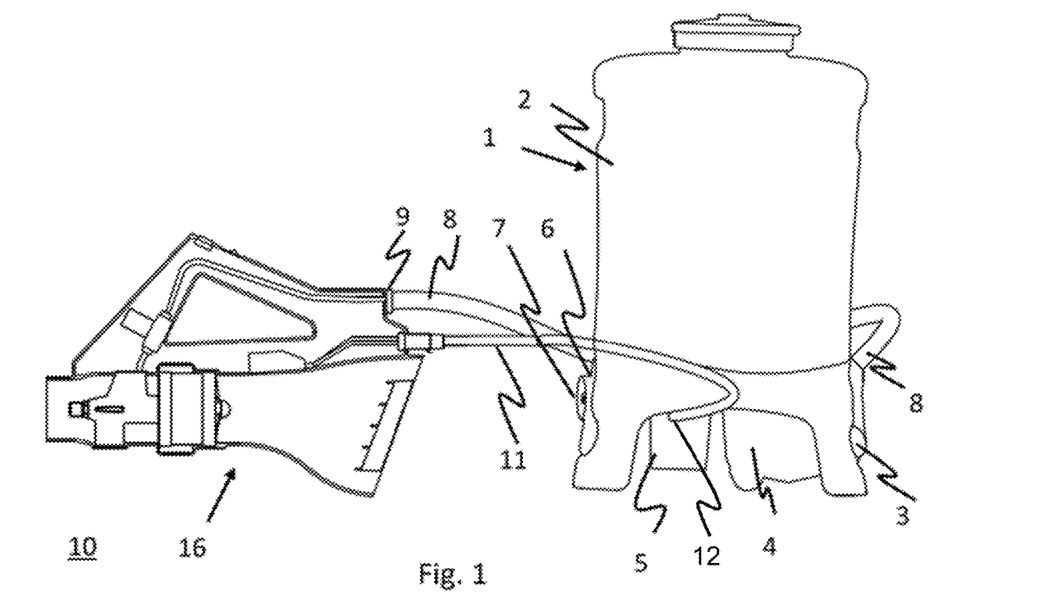
FIG. 1 shows a battery-operated back spray device with a blower spray device in perspective representation in one half of the housing, according to one embodiment.

FIG. 1 shows a battery-operated back sprayer 1 from Birchmeier Sprühtechnik AG, CH-5608 Stetten, which is marketed under the name REC 15. This sprayer 1 has a liquid tank 2, an air tank 3, an electric pump 4 and a battery or accumulator 5. A pressure sensor 6 is provided on the air tank 3, which is attached to a pressure regulator 7 on the back sprayer 1. The pressure regulator 7 can be used to adjust the pressure to the spray liquid. In addition, a liquid supply line 8 is connected to the air tank 3, which is detachably attached to a portable blower spray device 10, according to a first example embodiment, with a connection 9. Furthermore, the blower spray device 10 is connected to the battery 5 by an electrical cable 11 with an electrical plug 12.

Figure 2:
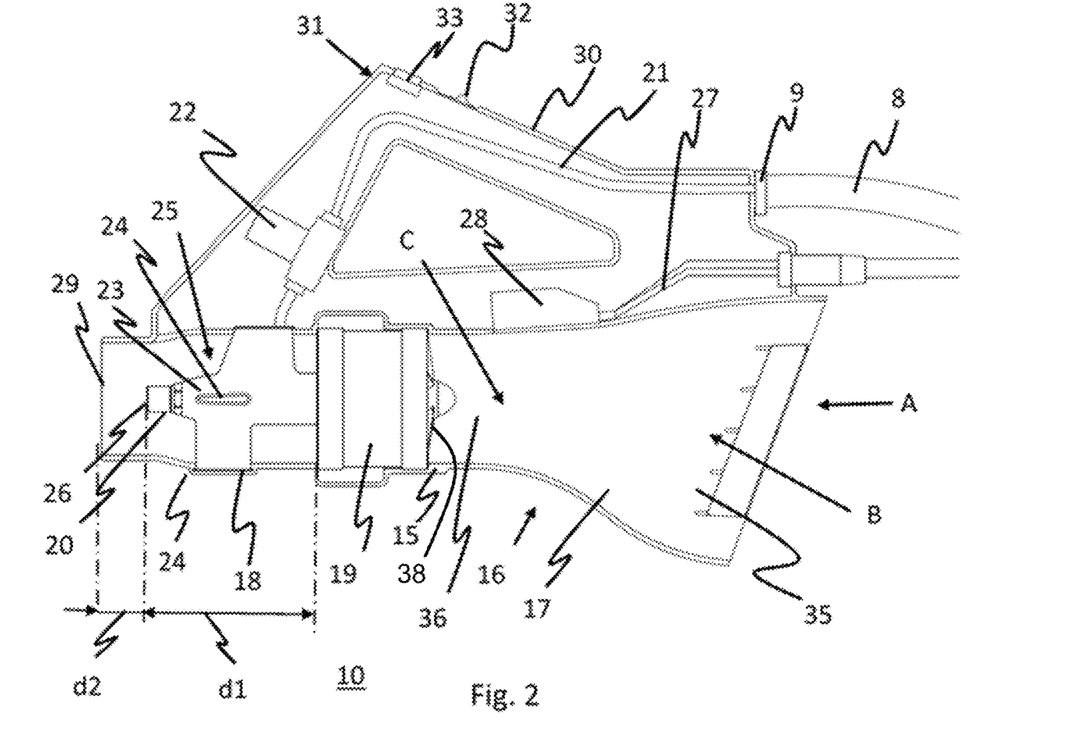
FIG. 2 shows an enlarged view of the blower spray device of FIG. 1.

FIG. 2 shows an enlarged view of the blower spray device 10, with the front half of the housing removed so that only the rear housing half 15 of the housing 16 is visible. The housing 16 has a funnel-shaped intake channel 17 and a tubular blow-out channel 18. An electric blower 19 with a blade wheel 38 is completely surrounded by the housing wall and fixed in the blow-out channel 18. To reduce vibration and motor noise, the electric blower 19 may be fastened and/or mounted floating in the blow-out channel 18, as described below for the second example embodiment of the blower spray device shown in FIGS. 3 and 4. In the blow-out channel 18, guide vanes—not shown here—are provided on the inside of the housing wall, which are arranged downstream of the blade wheel 38 in the axial direction of the blow-out channel 18 in flow direction A. These guide vanes can have a small angle of up to 10° to the axial direction. These guide vanes convert the turbulence generated by the blade wheel 38 into a swirl-free or almost swirl-free air flow. In flow direction A, after the electric blower 19, a spray nozzle 20 is mounted in the blow-out channel 18, which is connected to a liquid supply line 21 and an upstream electrically operated valve 22. With the valve or solenoid valve 22 the flow of spray liquid can be switched on. The spray nozzle 20 is mounted on the front end of a mounting tube 23, which is attached to the housing 16 with four supports 24 so that there is an open annular space 25 between the mounting tube 23 and the inner wall of the blow-out channel 18. The spray nozzle 20 is mounted at the front end of the mounting tube 23, so that the spray liquid flows out of the spray nozzle 20, resulting in a pre-atomization. The droplet size can be adjusted by selecting a suitable nozzle and applied pressure. Furthermore, an electrical cable 27 with an electronic controller 28 is provided for the blower 19 in the housing 16. The controller 28 can be used to set the rotational speed of the blower 19, i.e., the air speed. The housing 16 also has an angled handle 30 in which the liquid supply line 21 and the valve 22 are provided. In the angle range 31 of the handle 30 there is a switch 32 for the valve 22 and a regulating unit 33 for the controller 28, with which the exact rotation speed of the blower 19 can be set. The regulating unit 33 can be an analog knob or a digital setting.

The spray nozzle 20 is now arranged at a distance d1 from the outlet side of the blower 19. The spray nozzle 20 has an orifice 26 and the blow-out channel 18 has an outlet 29. The spraying angle is primarily determined by the suitable choice of spray nozzle 20. The orifice 26 is located within the blow-out channel 18 at a distance d2 from the outlet 29, so that the spray mist does not wet the wall of the blow-out channel 18 and can form unhindered.

The funnel-shaped intake channel 17 has an inlet port 35 with a large cross-section B and an outlet port 36 with a smaller cross-section C. The ratio between the large cross-section B and the small cross-section C is optimally designed in terms of flow technology in order to allow the air to flow out at the outlet of the blower at a flow velocity of approximately 5 to 120 m/s.

The inlet opening is so large that the suction speed is low at the typical outlet flow velocities, thus minimizing the risk of suction (leaves, etc.). In the present case, the ratio is 1:4, but it can also be lower or higher.

The spray nozzle 20 with the mounting tube 23 is arranged centrally in the blow-out channel 18. However, it can also be arranged decentrally or directly in the inner wall of the air blow-out channel 18. The spray nozzle 20 is selected from a larger range of nozzles, depending on the application. A full-cone nozzle, a hollow-cone nozzle, a flat-jet nozzle and an injector nozzle have proven themselves as spray nozzles 20. A so-called spinning disk, a multi-component nozzle or a piezo ultrasonic atomizer can also be used.

The above portable blower spray device 10 now allows an exact adjustment of the desired spray pattern for the spray mist to be produced by accurately adjusting the pressure of the spray liquid supplied, the air flow speed of the blown air and the pre-atomization by making the correction selection from various spray nozzles 20. This ensures that less chemical spray fluid is needed, for example, in crop protection. In particular, it has been shown that too high an air velocity causes damage to sensitive plants and/or that the plants suffer insufficient leaf wetting. At a lower air speed, the plant leaves are only swirled, so that optimal leaf wetting occurs without damage to the crop. The droplet size can also be adjusted by selecting the correct nozzle in order to keep aerosol formation or drift of the spray mist as low as possible or to achieve a long range of the spray mist.

In practice, the back sprayer 1 with the pressure regulator and the blower spray device 10 are used, wherein the required electrical energy is supplied by the battery 5. However, it is also possible to use a back sprayer without a pressure regulator, in which case the possible applications are limited or the result is not optimal. On the other hand, a sprayer may also be used on a non-motorized or motorized chassis, wherein the blower spray device 10 is mounted on the chassis either in a fixed manner, in an adjustable way in the X, Y and/or Z direction and/or in a pivotable manner. In such a case, several blower sprayers 10 or spray-blower units 40 may also be used. When using several blower spray devices 10 or spray-blower units 40, the supply of electrical energy and spraying liquid can take place centrally, with the possibility of individual adjustment of the individual blower spray devices 10 or spray-blower units 40.

Furthermore, the generated spray mist can be optimally introduced into the correct air flow. Various electronic control units are required for this purpose. For example, an electronic control unit may be provided which ensures that the spray liquid is not introduced into the air jet until the set air flow velocity has been reached. An electronic control unit may also be provided to allow the spray fluid to be introduced as a function of air flow velocity, which means that the spray fluid is introduced into the air flow only after a certain time delay or less spray fluid is introduced when the air flow velocity is reduced. The supply of spray liquid can also be completely stopped with a certain lead time before the air flow speed is throttled or stopped. This prevents spray liquid from dripping.

Figure 3:
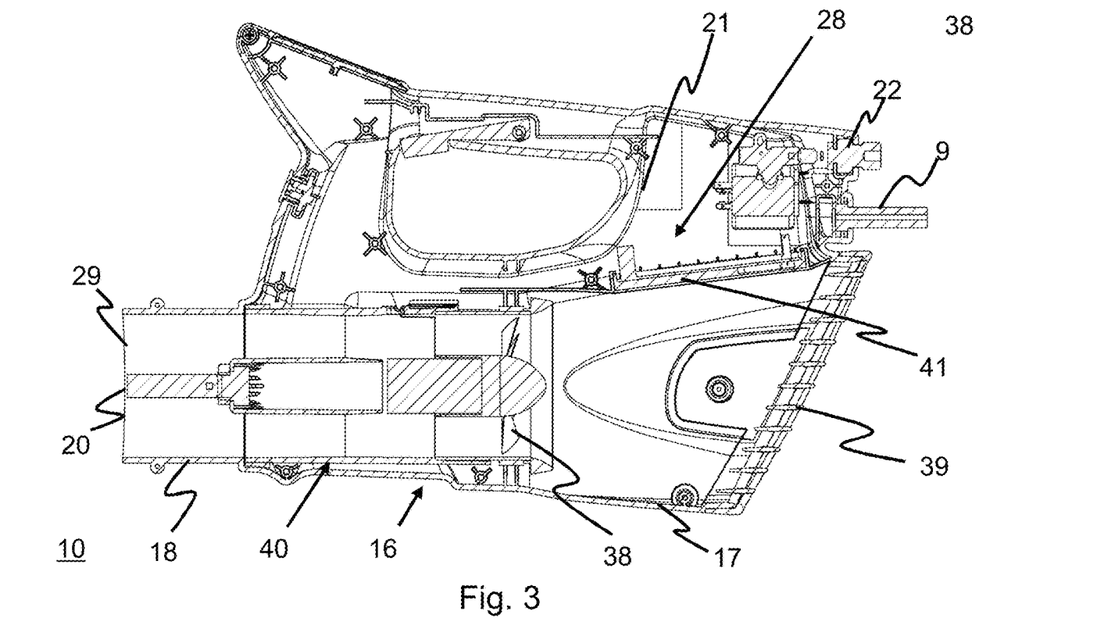
FIG. 3 shows a cross-section through another embodiment of the blower spray device.
Figure 4:
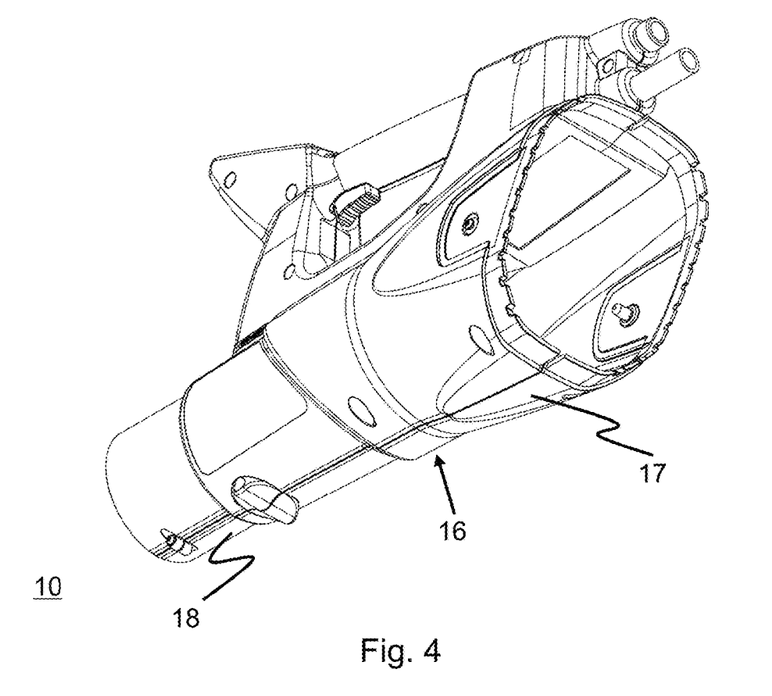
FIG. 4 shows the blower spray device of FIG. 3 in perspective view.

FIGS. 3 and 4 show a second example embodiment of a blower spray device 10 in a cross-section. The same or similar elements are shown with the same reference numerals as in FIG. 2. The electric spray-blower unit is provided here with the reference numeral 40. The electronic controller 28 is equipped with a heat sink 41, which is embedded in a corresponding opening in the intake channel 17. The funnel-shaped intake channel 17 has a considerably larger cross-section in this area than the cross-section in the discharge channel 18, so that a larger usable cooling surface is available here, thus achieving very efficient cooling of the electronic controller 28 by the heat sink 41. In addition, there is a lower air velocity here. Compared to cooling with fast blowing air in the blow-out channel 18, a further reduction in noise is achieved.

The inlet opening of the intake channel 17 is equipped with a grille 39 so that the intake channel 17 cannot be reached accidentally by hand. Also, the blade wheel 38 is far enough away from the inlet opening to prevent injury.

Figure 5:
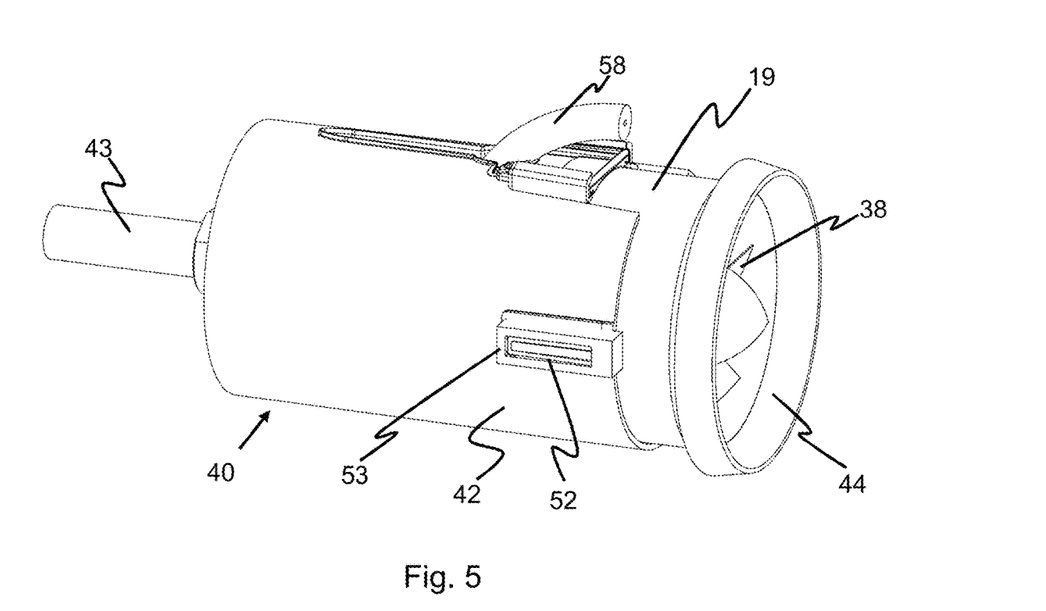
FIG. 5 shows a spray blower unit of the blower spray device in perspective view.
Figure 6:
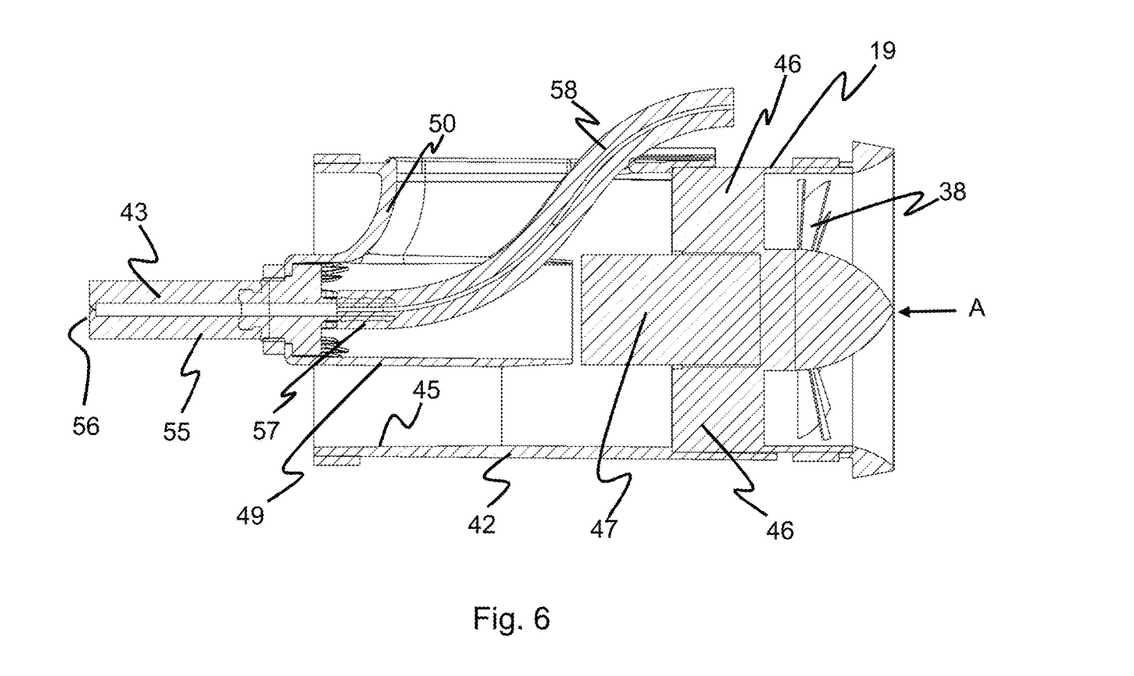
FIG. 6 shows a cross-section through the spray blower unit of FIG. 5.

FIGS. 5 and 6 show the spray blower unit 40 with the blade wheel 38 in more detail.

The essential difference from the first embodiment of FIG. 2 is that the blower 19 is arranged in an elongated, tubular housing 42, which at the same time serves for the mechanical fastening of the spray nozzle 43. The housing 42 has a ring-shaped inlet lip 44. The air is optimally sucked in by the inlet lip 44 so that a substantial reduction of the noise development is reached. On the inner wall 45 of the housing 42, two opposite guide vanes 46 are provided, which are aligned substantially parallel to the axial direction A. These guide vanes 46 can also have a small angle of up to about 10° to the axial direction A. In addition, these guide vanes 46 can be streamlined like wings. The electric drive 47 is provided behind the blade wheel 38. The mounting 49 of the spray nozzle 43 is now designed so that it is located in the slipstream of the electric drive or motor 47, so that the uniform swirl-free or almost swirl-free air flow generated by the guide vanes 46 cannot be disturbed. The suspension 50 of the mounting 49 on the housing 42 is also rounded and curved. This suspension 50 is formed in a very flat manner so that no disturbing turbulences are produced.

In order to minimize the transmission of vibrations of blower 19 to housing 16, housing 42 is mounted in a floating manner in housing 16. For this purpose, two opposite crossbars 52 attached to the outer wall of the housing 42 are provided, which are surrounded by a rectangular damping element 53 made of a suitable flexible material such as rubber. The inner wall of the housing 16 (see FIG. 3) embraces the damping element 53 with a contour with point-shaped supports—not shown—so that the transmission of sound and vibrations by the electric drive 47, the blade wheel 38 and air turbulences in the spray-blower unit 40 are counteracted.

Figure 7:
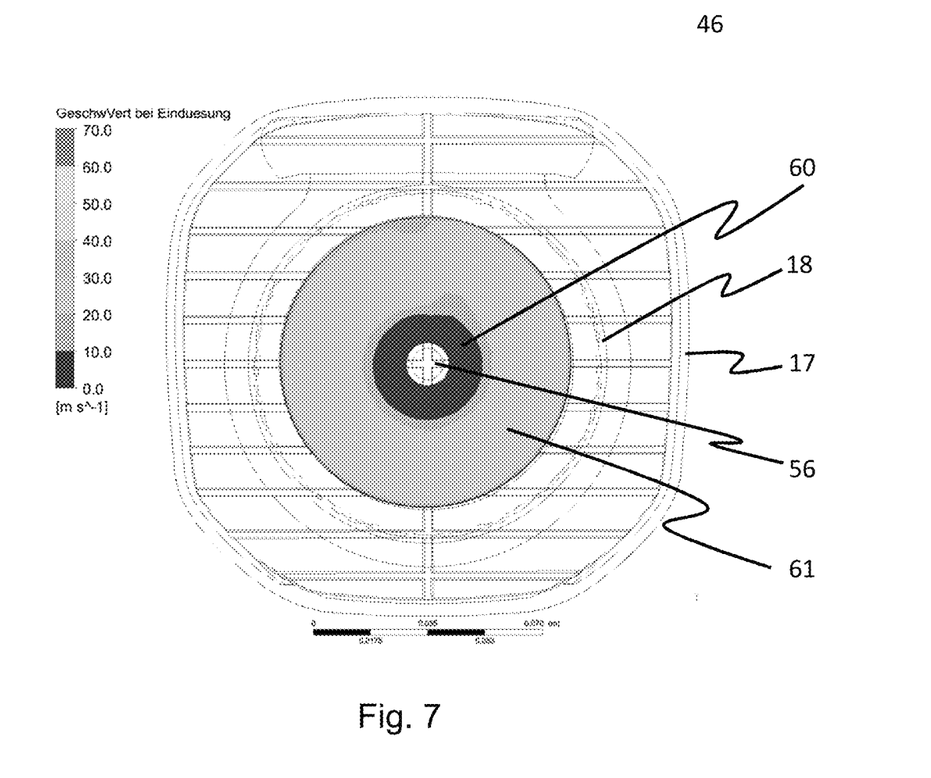
FIG. 7 shows a representation of the velocity distribution of the air flow at the outlet of the spray nozzle (injection)

The spray nozzle 43 is designed as an elongated tube 55 with a nozzle outlet 56, which has a connection nipple 57 to which the feed line 58 is connected. FIG. 7 shows the diagram of the velocity distribution of the outflowing air at nozzle outlet 56. The dark ring 60 around the nozzle outlet 56 indicates that there is virtually no airflow in the slipstream of the electric drive or motor 47 to allow the spray to form unobstructed. The grey area 61 shows that a strong air flow occurs here, which absorbs the spray mist leaving the nozzle outlet 56 and thus prevents the droplets from escaping from the air flow to the outside and thus being lost in the application. This declaration applies to both embodiments of the blower spray device 10 described.

Figure 8:
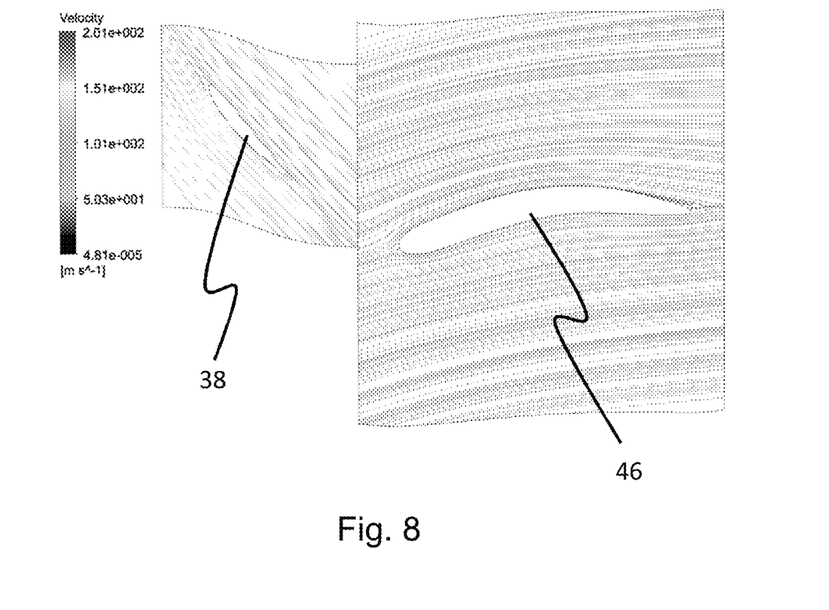
FIG. 8 shows the flow pattern from the rotating air flow generated by the blade wheel to a uniform, swirl-free air flow transferred by guide vanes.

FIG. 8 is a representation of the air flows by means of flow lines in the region of the blade wheel 38 and in the region of the guide vanes 46. It is apparent from this that the air flow rotating through the blade wheel 38 is converted by the guide vanes 46 into a uniform swirl-free or approximately swirl-free air flow, i.e., a linear air flow approximately in the axial direction. Due to this swirl-free or almost swirl-free air flow in axial direction, a greater throw distance of the spray mist can be achieved with less energy.

Figure 9:
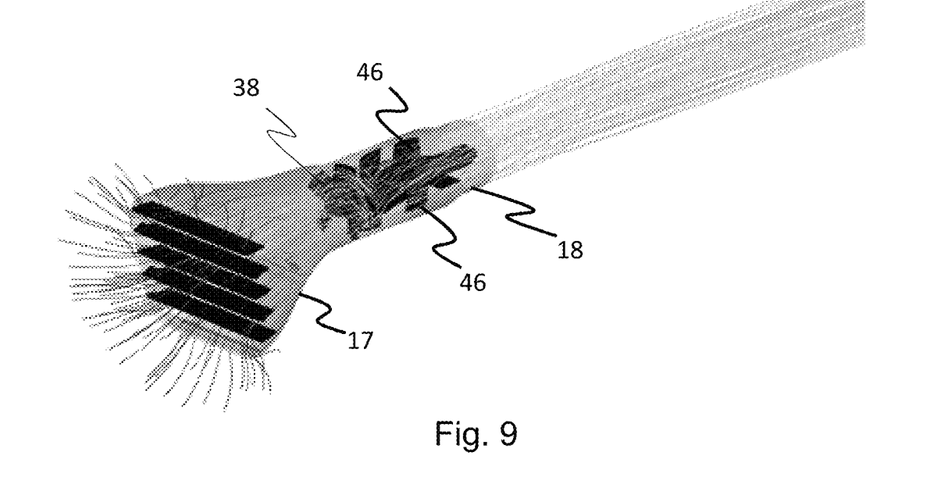
FIG. 9 shows a perspective diagram of the air flow through the entire blower spray device.

FIG. 9 shows the air flow by means of flow lines in a perspective view from the air inlet to the air outlet from the blower spray device 10.

Figure 10:
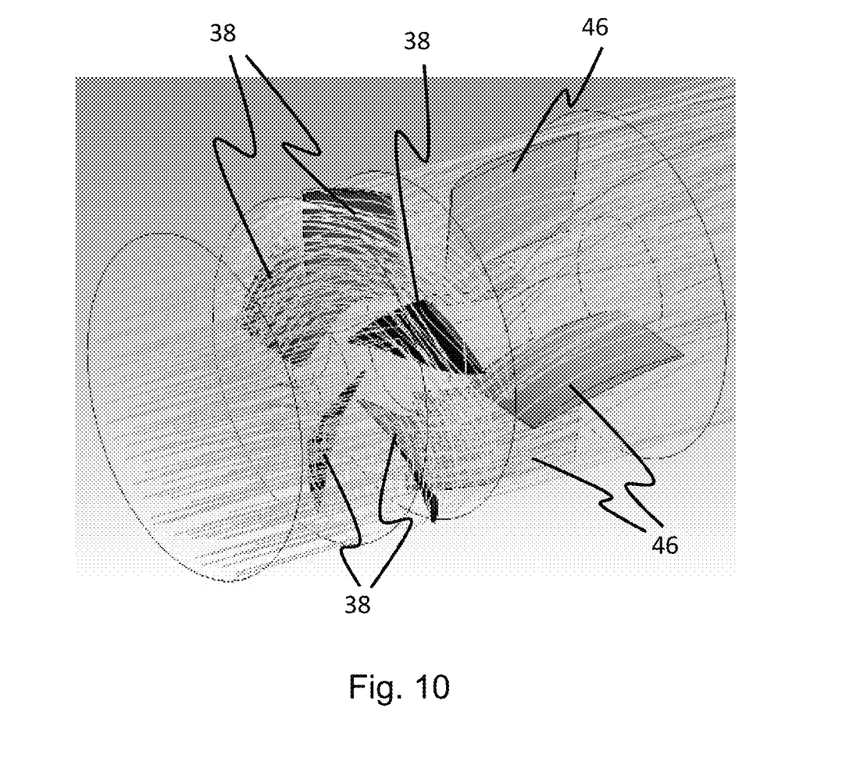
FIG. 10 shows a perspective representation of the air flow shown in FIG. 8.

FIG. 10 shows schematically the air flow by means of flow lines in a perspective view in the area of the blade wheel 38 and the guide vanes 46. From this it is very clear that in the area of the blade wheel 38—shown here with five blades 38—a rotating air flow or turbulence is generated, which is converted by means of the four guide vanes 46 into a swirl-free or almost swirl-free linear air flow.

The number of guide vanes 46 can vary depending on the requirements and design of the blade wheel 38. Usually the number is three to four, but can also be five or more. In the above examples, five blades 38 are provided. These can also be between five and seventeen, depending on requirements and design.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A blower spray device, comprising: a housing which accommodates an electric blower having a blade wheel and a spray nozzle; and
    a liquid supply line opening into the spray nozzle, the liquid supply line being in fluid communication with a pump configured to pressurize a fluid to be delivered as a spray mist emerging from the spray nozzle during operation of the electric blower, the pump being configured to adjust a pressure of the fluid for adjusting a spray quantity and a droplet size during operation of the electric blower;
    wherein the housing comprises a funnel-shaped intake channel and a tubular blow-out channel arranged along a central longitudinal axis, the funnel-shaped intake channel including an air inlet and having a throughflow cross-section that tapers in a direction of flow through the funnel-shaped intake channel,
    wherein the blade wheel of the electric blower is arranged downstream of the air inlet to receive a flow of air drawn through the air inlet by the electric blower during operation,
    wherein guide vanes are provided in the tubular blow-out channel in the direction of flow downstream of the blade wheel, the guide vanes being designed and arranged in such a way that turbulences produced by the blade wheel merge into a uniform, swirl-free air flow in an axial direction,
    wherein the spray nozzle is arranged concentrically within the tubular blow-out channel along the central longitudinal axis in the tubular blow-out channel in such a way that the swirl-free air flow receives the spray mist emerging from the spray nozzle during operation,
    wherein an electrically actuated valve is provided in the liquid supply line in order to activate and deactivate a liquid supply to the spray nozzle, and
    wherein an electronic controller is configured to vary an air flow velocity during the operation of the electric blower for transport of droplets in a spray mist generated by the nozzle in accordance with a respective application, the electronic controller being configured to vary the air flow velocity independently of the pressure provided by the pump.

2. The blower spray device according to claim 1, wherein the electric blower is arranged in an elongated, tubular sub-housing which simultaneously serves for a mechanical fastening of the spray nozzle.

3. The blower spray device according to claim 1, wherein the electric blower is mounted in a floating manner in the housing.

4. The blower spray device according to claim 1, wherein the blade wheel of the electric blower is mounted in the tubular blow-out channel, the tubular blow-out channel is arranged downstream of the funnel-shaped intake channel, and the spray nozzle is arranged in the direction of flow at a first distance from a blow-out side of the electric blower in the tubular blow-out channel and at a second distance from an outlet of the tubular blow-out channel.

5. The blower spray device according to claim 1, wherein the funnel-shaped intake channel has an inflow opening with a first, large cross-section and an outflow opening with a second, smaller cross-section.

6. The blower spray device according to claim 1, wherein the blower spray device is portable.

7. The blower spray device according to claim 1, wherein the blower spray device is mounted on a chassis.

8. The blower spray device of claim 1, wherein the electronic controller is configured to prevent activation of the liquid supply to the spray nozzle until a predetermined air flow in the tubular blow-out channel is reached.

9. The blower spray device of claim 1, wherein the electronic controller is configured to deactivate the liquid supply to the spray nozzle prior to cessation of air flow in the tubular blow-out channel.

10. The blower spray device of claim 1, wherein:
    the funnel-shaped intake channel comprises an air outlet opposite the air inlet,
    the air inlet comprises a first cross-sectional area;
    the air outlet comprises a second cross-sectional area; and
    a ratio of the first cross-sectional area to the second cross-sectional area is at least 4:1.

11. The blower spray device of claim 1, wherein the funnel-shaped intake channel is asymmetrical about the central longitudinal axis.

12. The blower spray device of claim 1, wherein the spray nozzle is arranged along the central longitudinal axis in the tubular blow-out channel, such that the spray nozzle is positioned within a slipstream of an electric drive of the blade wheel.

13. A method for producing a spray mist with a blower spray device including a housing which accommodates an electric blower having a blade wheel and a spray nozzle, and a liquid supply line opening into the spray nozzle, wherein the housing includes a funnel-shaped intake channel and a tubular blow-out channel arranged along a central longitudinal axis, the funnel-shaped intake channel including an air inlet and having a throughflow cross-section that tapers in a direction of flow through the funnel-shaped intake channel, wherein the blade wheel of the electric blower is arranged downstream of the air inlet to receive a flow of air drawn through the air inlet by the electric blower during operation, wherein guide vanes are provided in the tubular blow-out channel in the direction of flow downstream of the blade wheel, the guide vanes being designed and arranged in such a way that turbulences produced by the blade wheel merge into a uniform, swirl-free air flow in an axial direction, wherein the spray nozzle is arranged concentrically within the tubular blow-out channel along the central longitudinal axis in the tubular blow-out channel in such a way that the swirl-free air flow receives a spray mist emerging from the spray nozzle during operation, wherein an electrically actuated valve is provided in the liquid supply line in order to activate and deactivate a liquid supply to the spray nozzle, and wherein an electronic controller is configured to adjust an air flow velocity during operation of the electric blower in accordance with a respective application, and with a pump in fluid communication with the liquid supply line, the pump having a pressure control configured to adjust a pressure of the liquid supply during the operation of the electric blower, the method comprising:

selecting a spray liquid for the respective application;

selecting a spray nozzle with a specific spray angle and a specific drop size for the respective application from a selection of spray nozzles;

subjecting the spray liquid to a pressure set for the respective application or selection via the pump; and setting the air flow velocity of the electric blower for the respective application.

14. A blower spray device, comprising:

a housing which accommodates an electric blower having a blade wheel and a spray nozzle; and a liquid supply line opening into the spray nozzle, the liquid supply line in fluid communication with a pump configured to pressurize a fluid to be delivered as a spray mist emerging from the spray nozzle during operation of the electric blower, wherein the housing comprises a funnel-shaped intake channel and a tubular blow-out channel arranged along a central longitudinal axis, wherein guide vanes are provided in the tubular blow-out channel in a direction of flow downstream of the blade wheel and are arranged in a circumferential array around a common axis about which the blade wheel rotates, the guide vanes being designed and arranged in such a way that turbulences produced by the blade wheel merge into a uniform, swirl-free air flow in an axial direction, wherein the spray nozzle is arranged concentrically within the tubular blow-out channel along the central longitudinal axis in the tubular blow-out channel in such a way that the swirl-free air flow receives a spray mist emerging from the spray nozzle during operation, wherein an electrically actuated valve is provided in the liquid supply line in order to activate and deactivate a liquid supply to the spray nozzle, and wherein an electronic controller is configured to adjust an air flow velocity independently of operation of the pump, during operation of the electric blower, in accordance with a respective application.

15. The blower spray device of claim 14, wherein the electronic controller is configured to prevent activation of the liquid supply to the spray nozzle until a predetermined air flow in the tubular blow-out channel is reached.

16. The blower spray device of claim 14, wherein the electronic controller is configured to deactivate the liquid supply to the spray nozzle prior to cessation of air flow in the tubular blow-out channel.

17. The blower spray device of claim 14, wherein:

the funnel-shaped intake channel comprises an air outlet opposite an air inlet, the air inlet comprises a first cross-sectional area;

the air outlet comprises a second cross-sectional area; and a ratio of the first cross-sectional area to the second cross-sectional area is at least 4:1.

* * * * *